United States Patent
Kim

[11] Patent Number: 6,151,169
[45] Date of Patent: *Nov. 21, 2000

[54] SHEET TYPE OPTICAL DEVICE AND BACKLIGHTING UNIT USING THE SAME

[75] Inventor: Wook Sung Kim, Anyang-shi, Rep. of Korea

[73] Assignee: LG Electronics, Inc., Seoul, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 09/205,879

[22] Filed: Dec. 4, 1998

[30] Foreign Application Priority Data

May 20, 1998 [KR] Rep. of Korea ................ P98-18252

[51] Int. Cl.[7] .................. G02B 27/12; F21V 7/04; F21V 5/00; G02F 1/1335
[52] U.S. Cl. ................... 359/640; 362/31; 362/330; 362/339; 349/61; 349/62
[58] Field of Search ......................... 359/619, 621, 359/624–626, 628, 640, 707, 542, 592; 349/61, 64–65; 362/31, 26, 330, 339

[56] References Cited

U.S. PATENT DOCUMENTS

| | | | |
|---|---|---|---|
| Re. 35,704 | 12/1997 | Chiba et al. | 359/619 |
| 4,542,449 | 9/1985 | Whitehead | 362/330 |
| 5,126,882 | 6/1992 | Oe et al. | |
| 5,552,907 | 9/1996 | Yokota et al. | 359/49 |
| 5,575,549 | 11/1996 | Ishikawa et al. | 362/31 |
| 5,600,455 | 2/1997 | Ishikawa et al. | 349/57 |
| 5,659,410 | 8/1997 | Koike et al. | 349/82 |
| 5,675,357 | 10/1997 | Yoshida et al. | 345/104 |
| 5,724,108 | 3/1998 | Shibata | 349/62 |
| 5,730,518 | 3/1998 | Kashima et al. | 362/31 |
| 5,735,590 | 4/1998 | Kashima et al. | 362/31 |
| 5,851,062 | 12/1998 | Shinohara et al. | 362/31 |
| 5,887,964 | 3/1999 | Higuchi et al. | 362/31 |
| 5,966,192 | 10/1999 | Higuchi et al. | 349/61 |

*Primary Examiner*—Georgia Epps
*Assistant Examiner*—David N. Spector
*Attorney, Agent, or Firm*—Long, Aldridge & Norman

[57] ABSTRACT

A sheet type optical device that perpendicularly stands light beams progressing obliquely with respect to the plane of the sheet includes a transparent sheet made from a transmissive material and prisms formed in parallel on one surface thereof, the prisms having a vertical angle of about 50° to 70°. The light progressing obliquely with respect to the plane is perpendicularly stood by the prisms. The sheet type optical device is used to form a backlighting unit for a liquid crystal display panel or the like. The backlighting unit includes a light source, a light guide, and the sheet type optical device, and optionally includes a reflective plate, a diffusion panel and a protective film.

54 Claims, 7 Drawing Sheets

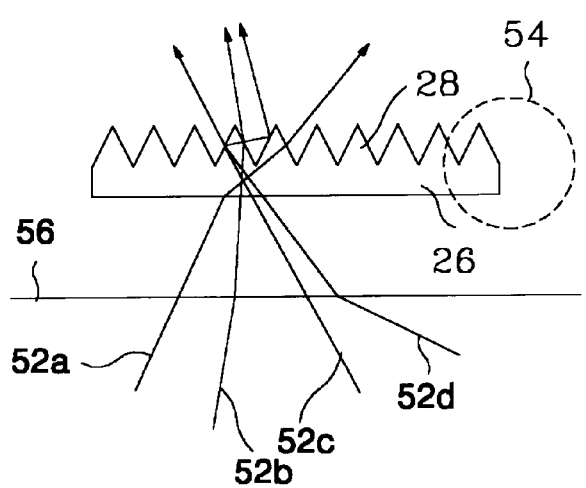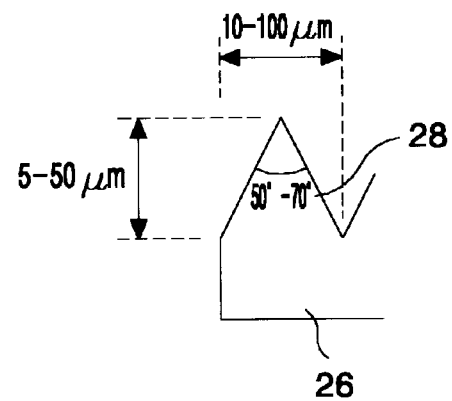
FIG. 5A
FIG. 5B

SHEET TYPE OPTICAL DEVICE AND BACKLIGHTING UNIT USING THE SAME

BACKGROUND OF THE INVENTION

1. Field of the Invention

This invention relates to an optical device for distributing light from a light source or a light emitting body, and more particularly, to a sheet type optical device for diverging the light in a required direction. Although this invention is useful for a variety of different applications, it is particularly useful for a backlighting unit employing the optical device adapted for use in a liquid crystal display device or the like.

2. Description of the Related Art

In a lighting panel for a liquid crystal display device or the like, a sheet type optical device is typically used to increase the light quantity in the sheet by concentrating the transmitted light in a specified angular range or by concentrating a light in a specified direction. An example of such a sheet type optical device includes a lighting panel disclosed in U.S. Pat. No. 4,542,449 issued to Lorne A. Whitehead on Sep. 17, 1985. The lighting panel comprises two sheets made of a transmissive material, called "prism sheets," each having a smooth surface and a corrugated surface in such a manner that light incident obliquely onto the sheet is emitted in a direction perpendicular to the sheet. In the lighting panel comprising two such sheets, the emitted light becomes uniform in the entire surface of the panel and the light quantity increases.

On the other hand, a backlighting unit used in a liquid crystal display device or the like provides a high luminance in a specified angular direction and concentrates the emitted light in a specified direction to increase the light quantity. To this end, the backlighting unit must use a sheet type optical device that allows a transmitted light to be oriented (or concentrated) in a specific direction. Accordingly, in the conventional backlighting unit, a lighting panel comprising two prism sheets as described above is used. As shown in FIG. 1, such a backlighting unit includes a lamp 10 for generating light, a light guide 12 for guiding the light from the lamp 10, and a lamp housing 14 installed at the side surface of the light guide 12 in a curved shape partially surrounding the lamp 10. A cold cathode ray tube is typically used as the lamp 10. The light generated at the lamp 10 is received through the side surface of the lighting guide 12. The lamp housing 14 includes a lamp reflector provided at the inner surface thereof. This lamp reflector enhances the utilization ratio of the light generated by the lamp 10 by reflecting the light from the lamp 10 toward the side surface of the light guide 12. The light guide 12 formed of a transparent material including plastic such as PMMA. The light guide 12 may have an inclined lower surface and a horizontal upper surface, or, alternatively, an inclined upper surface and a horizontal lower surface. The light from the lamp 10 travels through the panel and exits upwardly from the upper surface. A reflective plate 16 is provided at the lower side of the light guide 12, and a diffusion panel 18, first and second prism sheets 20 and 22 and a protective film 24 are sequentially arranged over the upper side of the light guide 12. The reflective plate 16 serves to reduce light loss by reflecting light transmitted downwardly through the lower surface of the light guide 12 back toward the light guide 12. The reflective plate 16 also improves the uniformity of the transmitted light across the upper surface of the light guide 12. The light guide 12 cooperates with the reflective plate 16 in this manner to guide the light from the lamp 10 upwardly. The light exiting the upper surface of the light guide 12 travels in a direction within an angular range from the normal direction of the upper surface.

The diffusion panel 18 positioned between the light guide 12 and the first prism sheet 20 distributes the light received from the light guide 12 and prevents light spots from forming due to partial concentration of the light. The diffusion panel 18 may also bend the light beams upwardly to a direction closer to the normal direction of the sheet. The first prism sheet 20 and the second prism sheet 22 constitute the above-mentioned lighting panel. The first prism sheet 20 has a smooth lower surface and an upper surface that is corrugated in the transverse direction (the direction perpendicular to the axis of the light source 10); while the second prism sheet 22 has a smooth lower surface and an upper surface that is corrugated in the longitudinal direction (the direction parallel to the axis of the light source 10). The first prism sheet 20 converges the light traveling toward the second prism sheet 22 in the transverse direction, and the second prism sheet 22 converges the light traveling toward the protective film 24 in the longitudinal direction. Because of the converging function of the first and second prism sheets 20 and 22, the direction of the light from the diffusion panel 18 is changed in such a manner that it travels toward the protective film 24 in a direction substantially perpendicular to the sheets. Accordingly, the light passing through the first and second prism sheets 20 and 22 travels almost perpendicularly to distribute uniformly on the entire surface of the protective film 24. Finally, the protective film 24 is used to protect the surface of the second prism sheet 22. It may also serve to diff-use the light in order to generate a more uniform distribution of the light.

As described above, the conventional sheet type optical device such as the lighting panel described above must use two prism sheets to generate a beam of light emitting from the panel at an angle of constant angular range. Thus, the conventional sheet type optical devices have a complicated structure, require increased number of steps in the fabricating process, and result in increased manufacturing cost. Further, for a backlighting unit using the two prism sheet structure, it is difficult to reduce the thickness of the panel to below a certain limit. Thus, such a backlighting unit suffers from the complex structure and increased manufacturing costs.

SUMMARY OF THE INVENTION

Accordingly, the present invention is directed to a sheet type optical device and a backlighting unit using the sheet type optical device that substantially obviate one or more of the problems due to limitations and disadvantages of the related art.

An object of the present invention is to provide a sheet type optical device that is suitable for perpendicularly stand a light progressing obliquely with respect to the plane.

Another object of the present invention is to provide a backlighting unit having a simplified structure using the sheet type optical device.

Yet another object of the present invention is to provide a backlighting unit having a shortened manufacturing process using the sheet type optical device.

Still another object of the present invention is to provide a backlighting unit having a reduced thickness using the sheet type optical device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other objects of the invention, as embodied and broadly described, a sheet type optical device according to one aspect of the present invention includes a transparent sheet made from a transmissive material; and a plurality of prisms formed in parallel on a first surface of the transparent sheet, the prisms having a vertical angle (or an apex angle) of about 50° to 70°, whereby a light received obliquely with respect to a second surface of the transparent sheet is almost perpendicularly output from the first surface.

A sheet type optical device according to another aspect of the present invention includes a transparent sheet made from a transmissive material; and a plurality of prisms formed in parallel on a first surface of the transparent sheet, the prisms having a vertical angle (or an apex angle) of about 50° to 70°, whereby a light received obliquely within an angular range of about 15° to 50° with respect to the normal direction of a second surface of the transparent sheet is almost perpendicularly output from the first surface.

A backlighting unit according to still another aspect of the present invention includes a light source for generating a light; a light guide having a light incident surface for receiving the light from the light source and a light emitting surface extending from the light incident surface, thereby uniformly distributing the light from the light source on the light emitting surface and outputting the light obliquely from the light emitting surface; and a prism panel having prisms and receiving light from the light emitting surface of the light guide, said prisms having a vertical angle (an apex angle) of about 50° to 70° and producing output light beams substantially perpendicular to the surface of the prism panel from light beams obliquely incident on the panel.

A backlighting unit according to a further aspect of the present invention includes a light source for generating a light; a light guide having a light incident surface for receiving the light from the light source and a light emitting surface extending from the light incident surface, thereby uniformly distributing the light from the light source on the light emitting surface and outputting the light obliquely at an angular range of about 15° to 50° from the normal direction of the light emitting surface, and a prism panel having prisms on a first surface and receiving light at a second surface from the light guide, said prisms having a vertical angle (or an apex angle) of about 50° to 70° and producing output light beams substantially perpendicular to the surface of the prism panel from incident light beams having an incident angle within a range of about 15° to 50° with respect to the normal direction of the panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5A is a partial cross-sectional view of a backlighting unit according to an embodiment of the present invention;

FIG. 5B illustrates the detail of a portion of the prism sheet of FIG. 5A;

DETAILED DESCRIPTION OF THE PREFERRED EMBODIMENTS

Prior to explaining the preferred embodiments of the present invention, the history of the development of a sheet type optical device according to the present invention is described below. A sheet type optical device according to the present invention was derived from results of experiments designed to explore whether or not light entering a smooth surface of a prism sheet having incident angles within a specified range is bent by the prism sheet so that the light exiting the prism surface has exit angles smaller than the incident angles, and whether and how the bending depends on the vertical or apex angle of the prisms (the prism angles). The incident angle is the angle between the direction of the incident light and the normal direction of the incident surface, and the exit angle is the angle between the direction of the exit light and the normal direction of the exit surface. The results were obtained from computer simulations and real experiments using prism sheets of various shapes. Specifically, light beam having an incident angle of about 1° to 85° was incident onto prism panels formed with prisms having various vertical angles. As a result of this, we found that light beans having an incident angle of about 15° to 50° were bent upwardly by prism panels having prism angles of 50° to 70° so that they have exit angles smaller than the incident angles (referred to as "perpendicular standing" of the incident light by the prism sheet). We also found that the extent of perpendicular standing of light having incident angles of about 15° to 50° depends on the refractive index of the prism panels. This dependency is more apparently seen from the incident and output light characteristics of the prism panel shown in FIGS. 2 to 4.

Reference will now be made in detail to the preferred embodiments of the present invention, examples of which are illustrated in the accompanying drawings.

Figure 1:
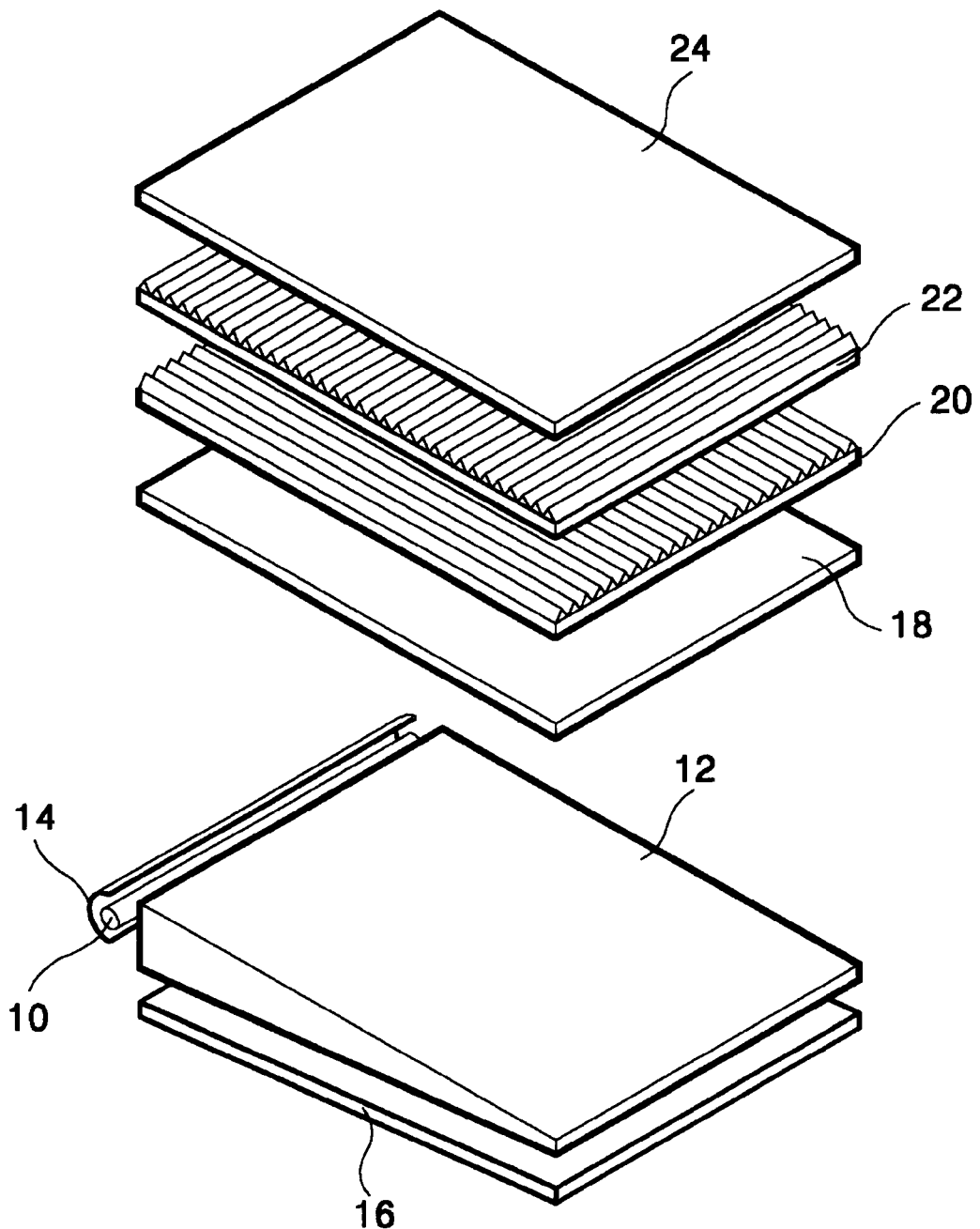
FIG. 1 is a schematic view of a conventional backlighting unit.
Figure 2:
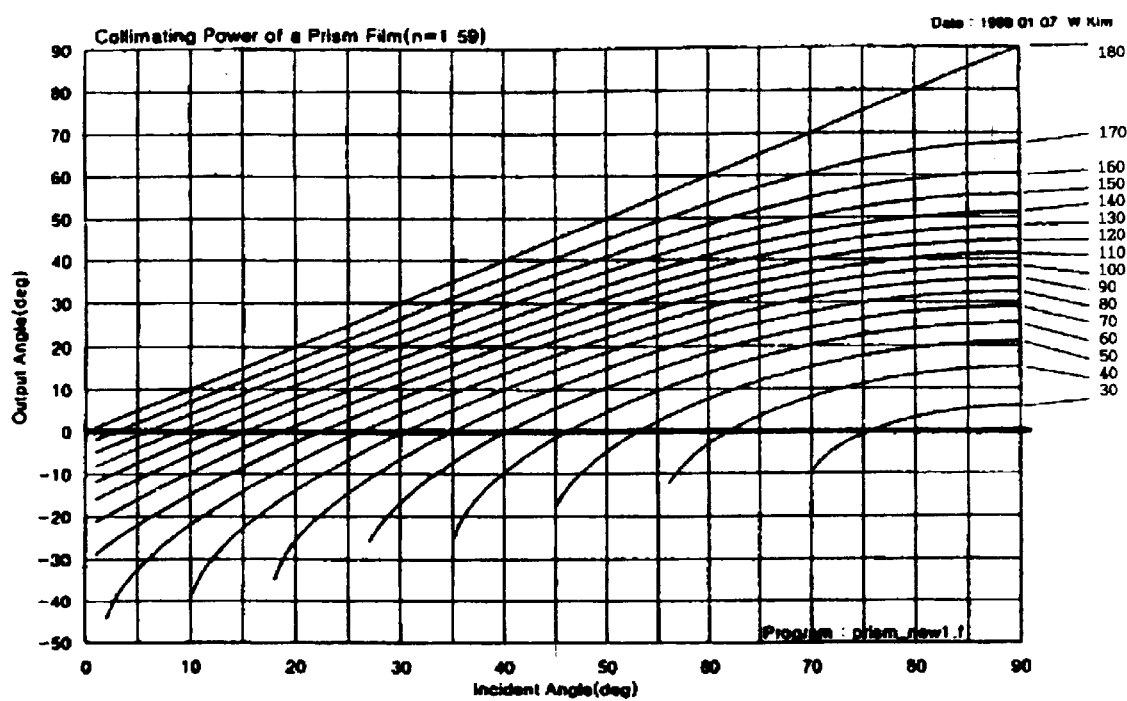
FIGS. 2, 3 and 4 are graphs illustrating incident angle and output angle characteristics in each prism panel formed with prisms having various vertical angles.
Figure 3:
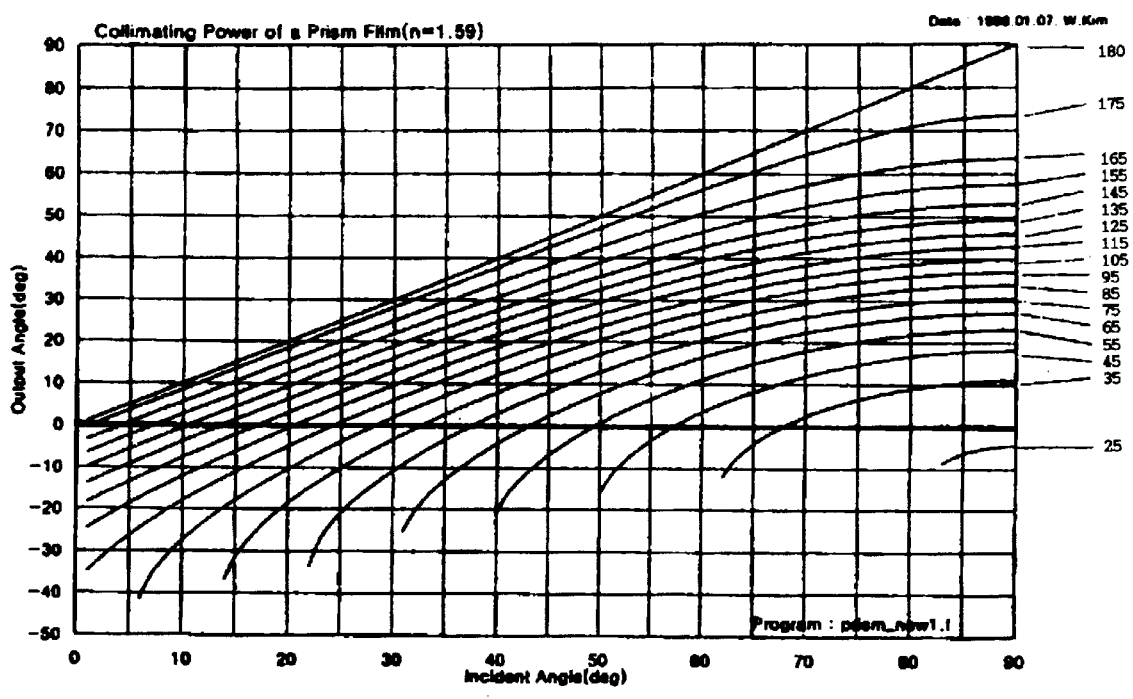
Figure 4:
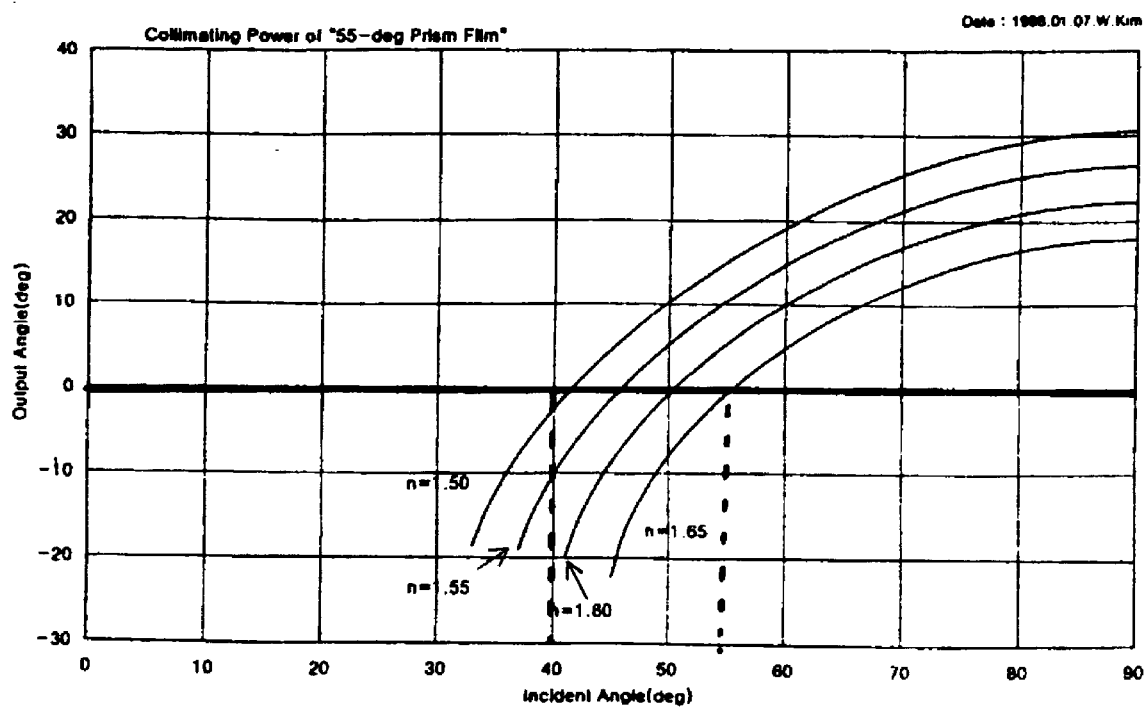

Referring now to the graphs in FIG. 2 and FIG. 3, each curve in the graphs represents a relationship between the incident angle (horizontal axis) and the exit angle (vertical axis) for a prism panel having a particular prism angle. It is noted that, in order for incident light having incident angles on the order of 20° to 50° to be outputted substantially perpendicularly, the prisms of the prism panel should preferably have a vertical angle of about 50° to 70°. The graphs in FIG. 2 and FIG. 3 are for prism panels made from a transparent material having a refractive index of 1.59. FIG. 4 is a graph illustrating the relationship between the exit angle and the incident angle when the refractive index of the prism panel changes from 1.5 to 1.65. FIG. 4 indicates that the light having an incident angle of about 30° to 50° becomes substantially perpendicularly stood by a prism panel having a vertical angle of about 50° to 60°. From these experimental results, the incident angles that gives rise to an exit angle of approximately zero degree may be calculated according to the refractive index of the prism panel material and the vertical angle of the prisms. Optimum incident angles are given in Table 1 below.

TABLE 1

| Refractive Index<br>Vertical Angle | 1.51 | 1.53 | 1.55 | 1.57 | 1.59 | 1.61 | 1.63 |
|---|---|---|---|---|---|---|---|
| 40° | 52.1° | 54.4° | 56.8° | 59.4° | 62.1° | 65.1° | 68.5° |
| 45° | 48.6° | 50.6° | 52.8° | 55.0° | 57.4° | 59.8° | 62.5° |
| 50° | 45.4° | 47.2° | 49.2° | 51.2° | 53.2° | 55.4° | 57.7° |
| 55° | 42.4° | 44.1° | 45.9° | 47.7° | 49.5° | 51.5° | 53.5° |
| 60° | 39.7° | 41.2° | 42.9° | 44.5° | 46.2° | 47.9° | 49.7° |
| 65° | 37.1° | 38.6° | 40.1° | 41.6° | 43.1° | 44.7° | 46.3° |
| 70° | 34.7° | 36.1° | 37.4° | 38.9° | 40.3° | 41.7° | 43.2° |

On the basis of these experimental results, a novel sheet type optical device has been developed adapted to perpendicularly stand light beams having incident angles from about 15° to 50°.

FIG. 5A is a partial cross-sectional view of a sheet type optical device according to the present invention. FIG. 5B illustrates in detail a portion 54 shown in FIG. 5A. As shown in FIGS. 5A and 5B, the sheet type optical device includes a transmissive sheet 26 made from a transparent material, and prisms 28 defined on the upper surface of the transmissive sheet 26. The prisms 28 other and are arranged in a horizontal direction (i.e. the direction perpendicular to the cross-sectional plane). Acrylic material and polyester group material such as polyethylene terephtalate (PET) may be used as the transparent material forming the transmissive sheet 26 and the prisms 28. Preferably, the prisms 28 and the sheet 26 are formed integrally from the transparent material. The prisms 28 may also be formed separately from the sheet 26 and subsequently mounted onto the sheet by using an adhesive or the like. Each prism 28 may have a vertical angle (the angle defined by the two faces of each prism) of about 50° to 70°, a width (the distance between the peaks of two successive prisms) of about 10 to 100 $\mu$m, and a height (the distance from the bottom of a valley to a peak of the prisms) of about 5 to 50 $\mu$m. Preferably, the vertical angle of each prism 28 is approximately 55°, the width and height of each prism 28 are approximately 50 $\mu$m and 25 $\mu$m, respectively. Light beams entering the lower surface (the smooth surface) of the transmissive sheet 26 are bent by the transmissive sheet and the prisms 28 in such a manner that incident light beams entering the lower surface in an oblique direction exit the upper surface (the surface having the prisms) in a substantially perpendicular direction. Specifically, the transmissive sheet 26 and the prisms 28 bend the incident light beams in such a manner that an incident light beam having an incident angle in a range of about 15° to 50° exits substantially perpendicularly, that is, at an exit angle of within 10°.

FIG. 5A also illustrates the refraction and reflection of light beams 52a–52d by the prism sheet. The line designated by numeral 56 represents the upper surface of a light guide or the like disposed underneath the prism sheet such as the diffusion panel 18 shown in FIG. 6.

Figure 6:
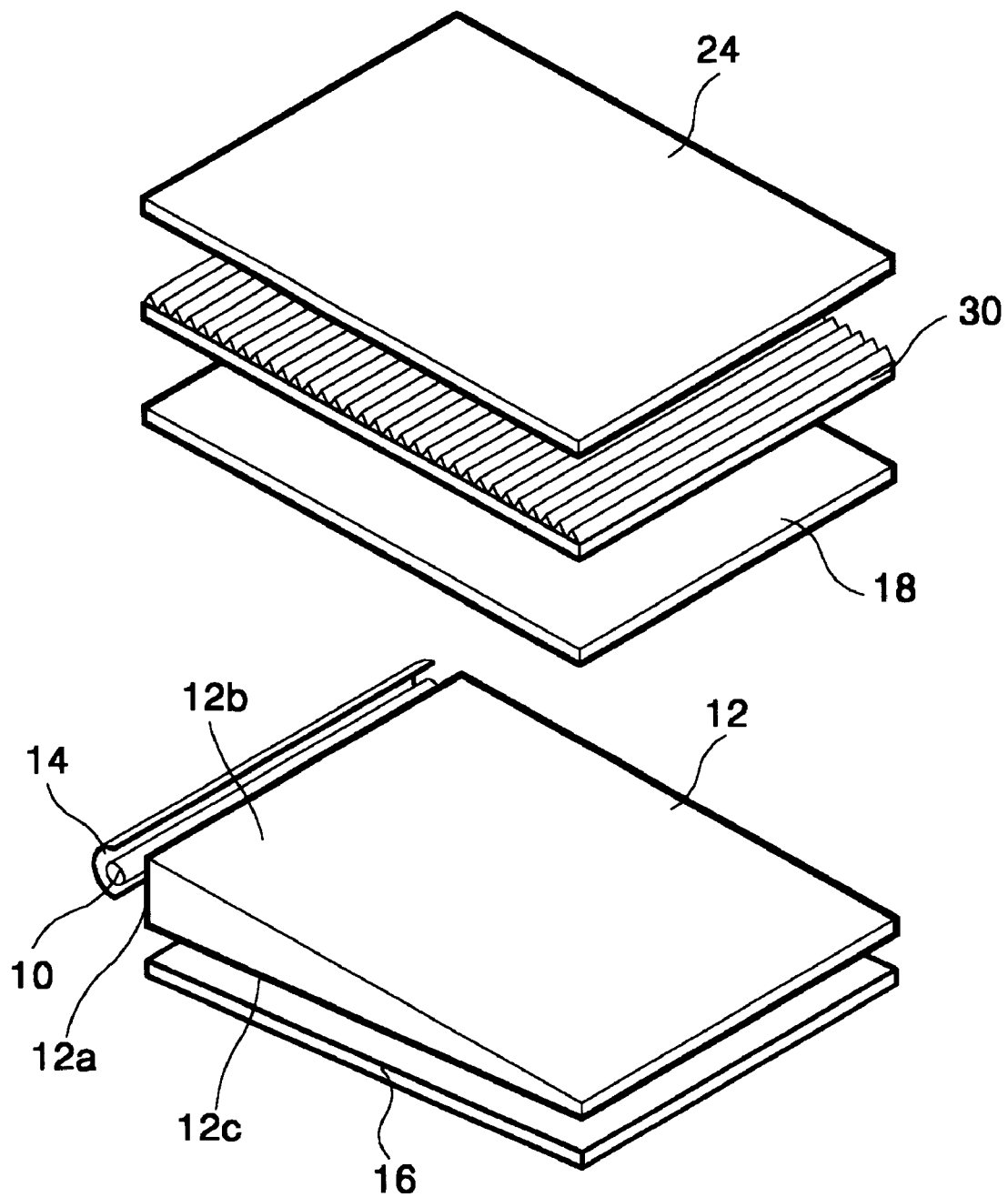
FIG. 6 is a schematic view of a backlighting unit according to an embodiment of the present invention.

FIG. 6 shows a backlighting unit according to an embodiment of the present invention employing the sheet type optical device shown in FIG. 5. As shown in FIG. 6, the backlighting unit includes a lamp 10 for generating light, a light guide 12 for guiding the light from the lamp 10, a lamp housing 14 installed at a side surface 12a of the light guide 12 in a curved shape surrounding the lamp 10, and a reflective plate 16 positioned below the light guide 12. A cold cathode ray tube is typically used as the lamp 10. The light generated by the lamp 10 is received through the side surface 12a of the light guide 12. The lamp housing 14 enhances the utilization ratio of the light generated by the lamp 10 by reflecting the light from the lamp 10 toward the side surface 12a of the light guide 12. The light guide 12 is formed in the shape of a panel from a transparent material including plastics, such as PMMA. The light guide 12 has an upper surface 12b and a lower surface 12c, one of the surface being horizontal and the other being inclined. For example, the lower surface 12c may be inclined and the upper surface 12b may be horizontal. Light received through the side surface 12a from the lamp 10 is guided upwardly and exits the upper surface 12b. The light exiting the upper surface 12b of the light guide 12 progresses obliquely at an angle of from about 15° to about 50° with respect to the vertical direction. The reflective plate 16 reduces the light loss by reflecting the light transmitted downwardly through the lower surface 12c of the light guide 12 back into the light guide 12. The reflective plate 16 also makes the distribution of light at the upper surface 12b more uniform. The light guide 12 cooperates with the reflective plate 16 in this manner to guide the light from the lamp 10 upwardly. The light exiting the light guide 12 from the upper surface 12b progresses obliquely, for example, within an angular range of approximately 15° to 50° with respect to the vertical direction.

The backlighting unit further includes a diffusion panel 18 disposed over the upper surface of the light guide 12, a prism panel 30 disposed over the diffusion panel 18, and a protective film 24 disposed over the prism panel 30. The diffusion panel 18 positioned between the light guide 12 and the prism panel 30 distributes the light received from the light guide 12 and prevents spots from being formed due to local concentration of light caused by, for example, defects on the surfaces of the light guide 12, non-uniformity in the density of the material of the light guide 12, reflection and/or scattering of light in the edges and corners of the light guide 12, patterns that may be formed in the light guide 12, and so on. The diffusion panel 18 also performs the function of perpendicularly standing the direction of light traveling toward the prism panel 30.

The prism panel 30 receives incident light beams from the diffusion panel 18, stands the light perpendicularly, i.e. bends the incident light so that the output light is substantially perpendicular to the panel, and directs the output light toward the protective film 24. The incident light beams are stood so that light beams having incident angles of from about 15° to 50° exit the prism panel at exit angles of less than 10°. To this end, the prism panel 30 has a vertical angle in a range of about 50° to 70°, and the prisms are arranged in parallel in the horizontal direction. Such a prism panel 30 stands the direction of light in such a manner that the exit light beams travel in a substantially perpendicular direction toward the protective film 24. Accordingly, the light passing through the prism panel 30 progresses substantially perpendicularly and is distributed uniformly on the entire surface of the protective film 24. The protective film 24 is used to protect the surface of the prism panel 30, but may also serve to diffusse the light to produce a more uniform distribution of light.

Figure 7:
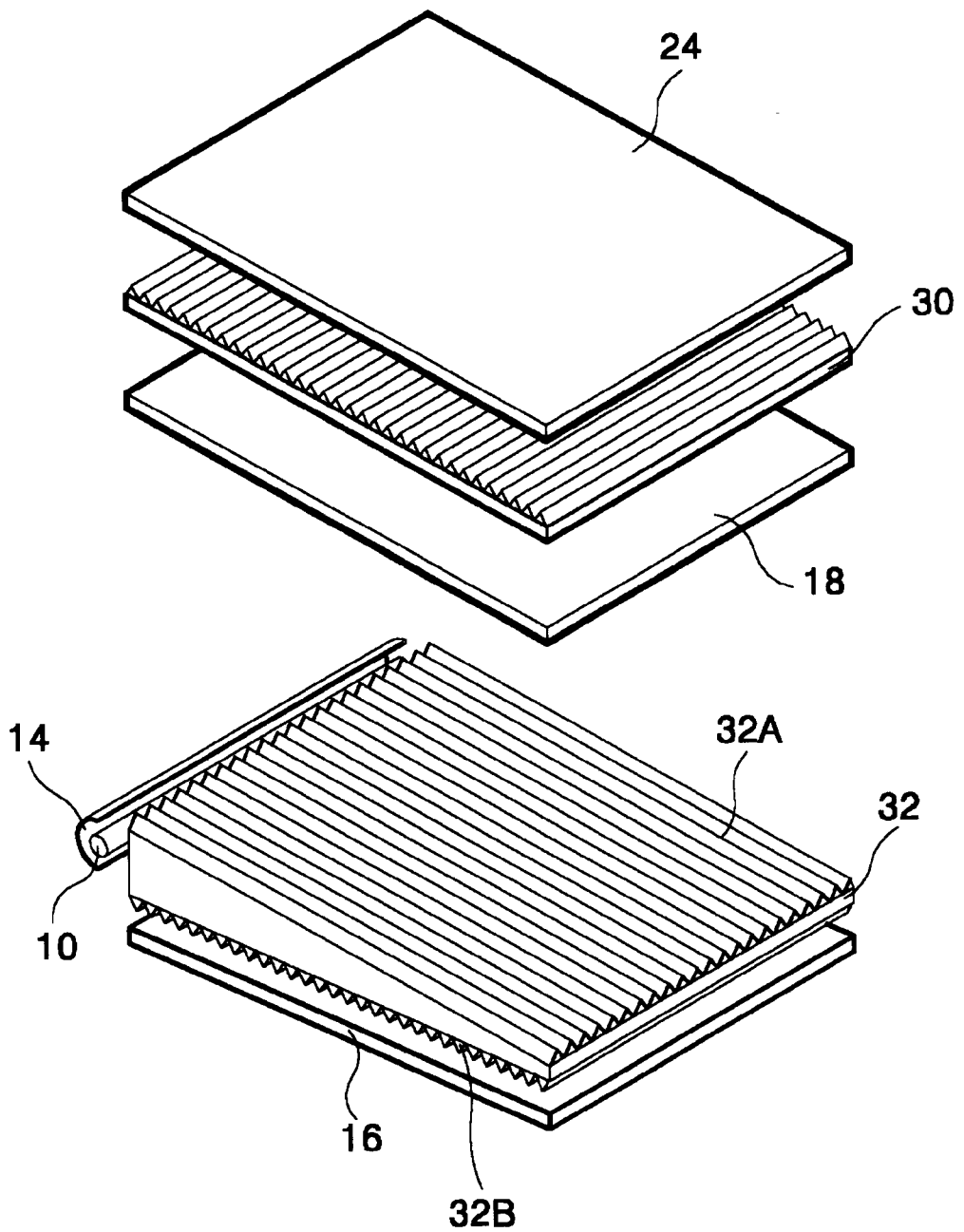
FIG. 7 is a schematic view of a backlighting unit according to another embodiment of the present invention.

FIG. 7 shows a backlighting unit according to another embodiment of the present invention. The backlighting unit in FIG. 7 is similar to the backlighting unit shown in FIG. 6 (with identical components identically designated), except that the light guide 12 in FIG. 6 is replaced by a patterned light guide 32. The patterned light guide 32 has an upper surface defining a first geometrical pattern 32A and a lower surface defining a second geometrical pattern 32B. The first geometrical pattern 32A includes of a plurality of parallel bands arranged in the transverse direction (i.e. the direction perpendicular to the axis of the lamp 10). The second geometrical pattern 32B includes of a number of parallel bands arranged in the longitudinal direction (i.e. the direction parallel to the axis of the lamp 10). The first geometrical pattern 32A reflects or refracts light so that the direction of the output light from the guide 32 is closer to the vertical direction and away from the longitudinal direction. The second geometrical pattern 32B reflects or refracts light so that the outgoing light from the guide 32 is closer to the vertical direction and away from the transverse direction. The light beams exit the upper surface of the patterned light guide 32 at angles ranging from about 30° to about 50° with respect to the normal direction of the panel. The first and second geometrical patterns 32A and 32B enhance the utilization ratio of the light generated by the lamp 10.

As described above, the sheet type optical device according to the present invention, which comprises prisms formed in the transparent sheet and having a vertical angle within a predetermined range, is effective in producing output light beams having substantially perpendicular directions from oblique incident light. The sheet type optical device according to the present invention includes a single prism sheet, thereby simplifying the usage and manufacturing thereof as well as reducing the manufacturing cost. Further, the backlighting unit according to the present invention employs a single sheet of prism panel to perpendicularly stand the light beams obliquely incident thereon, thereby simplifying the structure and the manufacturing process and reducing the thickness of the unit to a thickness below what could be attained by conventional backlighting units.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A sheet type optical device, comprising:
   a transparent sheet having first and second surfaces made from a light-transmissive material; and
   a plurality of prisms on the first surface of the transparent sheet, the prisms being substantially parallel to each other and having a vertical angle in a range of about 50° to 70°,
   wherein said transparent sheet and said prisms are made from a material having a refractive index in a range of about 1.5 to 1.65,
   whereby a light beam entering the second surface of the transparent sheet at an oblique incident angle exits the device in a direction substantially perpendicular to the first surface.

2. The sheet type optical device as claimed in claim 1, wherein said transparent sheet and said prisms are integrally formed of an acrylic material.

3. The sheet type optical device as claimed in claim 1, wherein said transparent sheet and said prisms are integrally formed of a polyester group material.

4. The sheet type optical device as claimed in claim 1, wherein said transparent sheet and said prisms are integrally formed of polyethylene terephtalate.

5. The sheet type optical device as claimed in claim 1, wherein the vertical angle of said prisms is about 55°.

6. The sheet type optical device as claimed in claim 1, wherein said prisms have a height in a range of about 5 to 50 $\mu$m and a width in a range of about 10 to 100 $\mu$m.

7. The sheet type optical device as claimed in claim 1, wherein the light beam exits the device at an angle of less than about 10° from a direction normal to the first surface.

8. A sheet type optical device, comprising:
   a transparent sheet having first and second surfaces made from a light-transmissive material; and
   a plurality of prisms formed on the first surface of the transparent sheet, the prisms being substantially parallel to each other and having a vertical angle in a range of about 50° to 70°,
   wherein said transparent sheet and said prisms are made from a material having a refractive index in a range of about 1.5 to 1.65,
   whereby a light beam entering the second surface of the transparent sheet at an incident angle in a range of about 15° to 50° exits the device in a direction substantially perpendicular to the first surface.

9. The sheet type optical device as claimed in claim 8, wherein said transparent sheet and said prisms are integrally formed of an acrylic material.

10. The sheet type optical device as claimed in claim 8, wherein said transparent sheet and said prisms are integrally formed of a polyester group material.

11. The sheet type optical device as claimed in claim 8, wherein said transparent sheet and said prisms are integrally formed of polyethylene terephtalate.

12. The sheet type optical device as claimed in claim 8, wherein the vertical angle of said prisms is about 55°.

13. The sheet type optical device as claimed in claim 8, wherein said prisms have a height in a range of about 5 to 50 $\mu$m and a width in a range of about 10 to 100 $\mu$m.

14. The sheet type optical device as claimed in claim 8, wherein the light beam exits the device at an angle of less than about 10° from a direction normal to the first surface.

15. A backlighting unit, comprising:
    a light source for generating light;
    a light guide having a light receiving surface disposed adjacent the light source for receiving the light from the light source and a light emitting surface extending from the light receiving surface, the light guide uniformly distributing the light from the light source on the light emitting surface, the light exiting the light emitting surface obliquely; and
    a prism panel having a plurality of prisms on a first surface with a vertical angle in a range of about 50° to 70°, wherein said prisms are made from a material having a refractive index in a range of about 1.5 to 1.65, the prism panel being disposed to receive light from the light emitting surface of the light guide, whereby the received light exits the panel in a direction substantially perpendicular to the first surface.

16. The backlighting unit as claimed in claim 15, further comprising:
    a diffusion panel disposed between the light guide and the prism panel for diffusing the light progressing from the light guide to the prism panel.

17. The backlighting unit as claimed in claim 15, further comprising:
    a protective film disposed over the first surface of the prism panel for protecting the prisms.

18. The backlighting unit as claimed in claim 17, wherein the light emitting surface of the light guide is extended obliquely from the light receiving surface.

19. The backlighting unit as claimed in claim 15, further comprising:
    a reflective plate disposed at a third surface of the light guide opposing the light emitting surface thereof for refracting the light traveling toward the third surface back toward the light emitting surface.

20. The backlighting unit as claimed in claim 15, further comprising:
   a diffusion panel disposed between the light guide and the prism panel for diffusing the light progressing from the light guide to the prism panel;
   a protective film disposed over the first surface of the prism panel for protecting the prisms; and
   a reflective plate disposed at a third surface of the light guide opposing the light emitting surface thereof for reflecting the light traveling toward the third surface back toward the light emitting surface.

21. The backlighting unit as claimed in claim 15, wherein the light emitting surface of the light guide defines a first geometrical reflective pattern to reflect and/or refract light.

22. The backlighting unit as claimed in claim 21, wherein the light guide has a third surface opposing the light emitting surface, the third surface defining a second geometrical reflective pattern to reflect and/or refract light.

23. The backlighting unit as claimed in claim 15, wherein the light guide has a third surface opposing the light emitting surface, the third surface defining a geometrical reflective pattern to reflect and/or refract light.

24. The backlighting unit as claimed in claim 23, further comprising:
   a diffusion panel disposed between the light guide and the prism panel for diffusing the light progressing from the light guide to the prism panel.

25. The backlighting unit as claimed in claim 23, further comprising:
   a protective film disposed over the first surface of the prism panel for protecting the prisms.

26. The backlighting unit as claimed in claim 23, further comprising:
   a reflective plate disposed adjacent a third surface of the light guide opposing the light emitting surface thereof for reflecting the light exiting from the third surface back into the light guide toward the light emitting surface.

27. The backlighting unit as claimed in claim 23, further comprising:
   a diffusion panel disposed between the light guide and the prism panel for diffusing the light progressing from the light guide to the prism panel;
   a protective film disposed over the first surface of the prism panel for protecting the prisms; and
   a reflective plate disposed adjacent a third surface of the light guide opposing the light emitting surface thereof for reflecting the light exiting from the third surface back into the light guide toward the light emitting surface.

28. The backlighting unit as claimed in claim 15, wherein the light exits the prism panel in a direction less than about 10° from a direction normal to the first surface.

29. A backlighting unit, comprising:
   a light source for generating light;
   a light guide having a light receiving surface disposed adjacent the light source for receiving the light from the light source and a light emitting surface extending from the light receiving surface, the light guide uniformly distributing the light from the light source on the light emitting surface, the light exiting the light emitting surface obliquely at an angle of about 15° to 50° with respect to a direction normal to the light emitting surface; and
   a prism panel having a plurality of prisms on a first surface, each prism having a vertical angle of about 50° to 70°, wherein said prisms are made from a material having a refractive index in a range of about 1.5 to 1.65, the prism panel being disposed to receive light at a second surface thereof from the light emitting surface of the light guide, whereby a light beam received at the second surface at an incident angle of about 15° to 50° exits the panel in a direction substantially perpendicular to the first surface.

30. The backlighting unit as claimed in claim 29, further comprising:
   a diffusion panel disposed between the light guide and the prism panel for diffusing the light progressing from the light guide to the prism panel.

31. The backlighting unit as claimed in claim 29, further comprising:
   a protective film disposed over the first surface of the prism panel for protecting the prisms.

32. The backlighting unit as claimed in claim 29, wherein the light emitting surface of the light guide is extended obliquely from the light receiving surface.

33. The backlighting unit as claimed in claim 29, further comprising:
   a reflective plate disposed at a third surface of the light guide opposing the light emitting surface thereof for refracting the light traveling toward the third surface back toward the light emitting surface.

34. The backlighting unit as claimed in claim 29, further comprising:
   a diffusion panel disposed between the light guide and the prism panel for diffusing the light progressing from the light guide to the prism panel;
   a protective film disposed over the first surface of the prism panel for protecting the prisms; and
   a reflective plate disposed at a third surface of the light guide opposing the light emitting surface thereof for reflecting the light traveling toward the third surface back toward the light emitting surface.

35. The backlighting unit as claimed in claim 29, wherein the light emitting surface of the light guide defines a first geometrical reflective pattern to reflect and/or refract light.

36. The backlighting unit as claimed in claim 35, wherein the light guide has a third surface opposing the light emitting surface, the third surface defining a second geometrical reflective pattern to reflect and/or refract light.

37. The backlighting unit as claimed in claim 29, wherein the light guide has a third surface opposing the light emitting surface, the third surface defining a second geometrical reflective pattern to reflect and/or refract light.

38. The backlighting unit as claimed in claim 37, further comprising:
   a diffusion panel disposed between the light guide and the prism panel for diffusing the light progressing from the light guide to the prism panel.

39. The backlighting unit as claimed in claim 37, further comprising:
   a protective film disposed over the first surface of the prism panel for protecting the prisms.

40. The backlighting unit as claimed in claim 37, further comprising:
   a reflective plate disposed adjacent a third surface of the light guide opposing the light emitting surface thereof for reflecting the light exiting from the third surface back into the light guide toward the light emitting surface.

41. The backlighting unit as claimed in claim 37, further comprising:
   a diffusion panel disposed between the light guide and the prism panel for diffusing the light progressing from the light guide to the prism panel;
   a protective film disposed over the first surface of the prism panel for protecting the prisms; and
   a reflective plate disposed adjacent a third surface of the light guide opposing the light emitting surface thereof for reflecting the light exiting from the third surface back into the light guide toward the light emitting surface.

42. The backlighting unit as claimed in claim 29, wherein the light exits the prism panel in a direction less than about 10° from the direction normal to the first surface.

43. A sheet type optical device, comprising:
   a transparent sheet having a first surface; and
   a plurality of prisms formed on the first surface of the transparent sheet, the prisms being parallel to each other and each having a vertical angle of about 50° to 70°, a height of about 5 to 50 μm and a width of about 10 to 100 μm,
   wherein the transparent sheet and the prisms are made from a light-transmissive material having a refractive index of about 1.5 to 1.65.

44. A backlighting unit, comprising:
   a light source for generating light;
   a light guide having a light receiving surface for receiving the light from the light source and a light emitting surface extending from the light receiving surface, the light guide uniformly distributing the light from the light source on the light emitting surface; and
   a prism panel comprising a transparent sheet having first and second opposing surfaces and a plurality of prisms formed on the first surface, the prisms being parallel to each other and each having a vertical angle of about 50° to 70°, a height of about 5 to 50 μm and a width of about 10 to 100 μm, the transparent sheet and the prisms being made from a light-transmissive material having a refractive index of about 1.5 to 1.65, wherein the second surface of the transparent sheet is disposed to receive light from the light emitting surface of the light guide.

45. The backlighting unit as claimed in claim 44, wherein the light emitting surface of the light guide is extended obliquely from the light receiving surface.

46. A method of forming a sheet type optical device, comprising:
   providing a transparent sheet having first and second surfaces made from a light-transmissive material; and
   forming a plurality of prisms on the first surface of the transparent sheet, wherein said prisms are made from a material having a refractive index in a range of about 1.5 to 1.65, the prisms being substantially parallel to each other and having a vertical angle in a range of about 50° to 70°,
   whereby a light beam entering the second surface of the transparent sheet at an oblique incident angle exits the device in a direction substantially perpendicular to the first surface.

47. A method of forming a sheet type optical device, comprising:
   providing a transparent sheet having first and second surfaces made from a light-transmissive material; and
   forming a plurality of prisms on the first surface of the transparent sheet, wherein said prisms are made from a material having a refractive index in a range of about 1.5 to 1.65, the prisms being substantially parallel to each other and having a vertical angle in a range of about 50° to 70°,
   whereby a light beam entering the second surface of the transparent sheet at an incident angle in a range of about 15° to 50° exits the device in a direction substantially perpendicular to the first surface.

48. A method of assembling a backlight unit, comprising:
   providing a light source for generating light;
   providing a light guide having a light receiving surface disposed adjacent the light source for receiving the light from the light source and a light emitting surface extending from the light receiving surface, the light guide uniformly distributing the light from the light source on the light emitting surface, the light exiting the light emitting surface obliquely; and
   providing a prism panel having a plurality of prisms on a first surface with a vertical angle in a range of about 50° to 70°, wherein said prisms are made from a material having a refractive index in a range of about 1.5 to 1.65, the prism panel being disposed to receive light from the light emitting surface of the light guide, whereby the received light exits the panel in a direction substantially perpendicular to the first surface.

49. A method of assembling a backlighting unit as claimed in claim 48, wherein the light emitting surface of the light guide is extended obliquely from the light receiving surface.

50. A method of assembling a backlight unit, comprising:
   providing a light source for generating light;
   providing a light guide having a light receiving surface disposed adjacent the light source for receiving the light from the light source and a light emitting surface extending from the light receiving surface, the light guide uniformly distributing the light from the light source on the light emitting surface, the light exiting the light emitting surface obliquely at an angle of about 15° to 50° with respect to a direction normal to the light emitting surface; and
   providing a prism panel having a plurality of prisms on a first surface with a vertical angle in a range of about 50° to 70°, wherein said prisms are made from a material having a refractive index in a range of about 1.5 to 1.65, the prism panel being disposed to receive light at a second surface thereof from the light emitting surface of the light guide, whereby a light beam received at the second surface at an incident angle of about 15° to 50° exits the panel in a direction substantially perpendicular to the first surface.

51. The backlighting unit as claimed in claim 50, wherein the light emitting surface of the light guide is extended obliquely from the light receiving surface.

52. A method of fabricating a sheet-type optical device, comprising:
   providing a transparent sheet made from a light-transmissive material having a refractive index of about 1.5 to 1.65; and
   forming a plurality of prisms on a first surface of the transparent sheet, the prisms being parallel to each other and each having a vertical angle of about 50° to 70°, a height of about 5 to 50 μm and a width of about 10 to 100 μm.

53. A method of assembling backlighting unit, comprising:
   providing a light source for generating light;

providing a light guide having a light receiving surface disposed adjacent the light source for receiving the light from the light source and a light emitting surface extending from the light receiving surface, the light guide uniformly distributing the light from the light source on the light emitting surface; and providing a prism panel comprising a transparent sheet having first and second opposing surfaces and a plurality of prisms formed on the first surface, the prisms being parallel to each other and each having a vertical angle of about 50° to 70°, a height of about 5 to 50 μ and a width of about 10 to 100 μm, the transparent sheet and the prisms being made from a light-transmissive material having a refractive index of about 1.5 to 1.65, wherein the second surface of the transparent sheet is disposed to receive light from the light emitting surface of the light guide.

54. The backlighting unit as claimed in claim 53, wherein the light emitting surface of the light guide is extended obliquely from the light receiving surface.

* * * * *